United States Patent [19]
DeCecca et al.

[11] Patent Number: 5,765,042
[45] Date of Patent: Jun. 9, 1998

[54] ONE-TIME-USE CAMERA WITH MATCHING INDICIA ON CAMERA EXTERIOR AND FILM CASSETTE

[75] Inventors: Michael L. DeCecca, Fairport; Mark A. Lamphron, Rochester; Jorg A. Matull, Spencerport, all of N.Y.

[73] Assignee: Eastman Kodak Company, Rochester, N.Y.

[21] Appl. No.: 781,635

[22] Filed: Jan. 10, 1997

[51] Int. Cl.⁶ .................................................. G03B 17/02
[52] U.S. Cl. ........................ 396/6; 396/292; 396/295; 396/535
[58] Field of Search ........................ 396/6, 281, 287, 396/290, 291, 292, 295, 535, 538; 283/98, 99, 101, 103, 104

[56] References Cited

U.S. PATENT DOCUMENTS

| | | | |
|---|---|---|---|
| 3,505,954 | 4/1970 | Projansky | 283/98 |
| 3,631,617 | 1/1972 | Pekko | 283/101 |
| 3,650,210 | 3/1972 | Archer | 283/98 |
| 4,746,945 | 5/1988 | Chan | 396/535 |
| 4,890,130 | 12/1989 | Takei et al. | 396/6 |
| 5,021,811 | 6/1991 | Maurinus et al. | 396/6 |
| 5,178,270 | 1/1993 | Adams et al. | 206/256 |
| 5,313,240 | 5/1994 | Lyon et al. | 396/6 |
| 5,343,265 | 8/1994 | Oi et al. | 396/6 |
| 5,488,445 | 1/1996 | Oi et al. | 396/6 |
| 5,517,270 | 5/1996 | Balling | 354/288 |
| 5,604,556 | 2/1997 | Meyerhoefer et al. | 396/538 |

*Primary Examiner*—Eddie C. Lee
*Attorney, Agent, or Firm*—Roger A. Fields

[57] ABSTRACT

A one-time-use camera comprises a film cartridge and a filmstrip, a lighttight camera body having an interior chamber for the film cartridge and an exterior cover portion for light-tightly sealing the chamber that can be separated from another exterior (remaining) portion to open the chamber in order to remove the film cartridge, and matching respective indicia on the outside of the camera body and on the film cartridge and/or the filmstrip. The indicia on the outside of the camera body is positioned partially on the exterior cover portion and partially on the other exterior portion to be divided in order to be visually obliterated when the exterior cover portion is separated from the other exterior portion to open the chamber. Thus, the one-time camera cannot practically be reused without removing or covering the part of the indicia on the other exterior (remaining) portion of the camera body.

3 Claims, 3 Drawing Sheets

ONE-TIME-USE CAMERA WITH MATCHING INDICIA ON CAMERA EXTERIOR AND FILM CASSETTE

FIELD OF THE INVENTION

The invention relates generally to the field of photography, and in particular to one-time-use cameras. More specifically, the invention relates to a one-time-use camera with matching indicia on the camera exterior and on a film cartridge and/or a filmstrip pre-loaded in the one-time-use camera.

BACKGROUND OF THE INVENTION

Film and cameras that are all in one, commonly referred to as single-use or one-time-use cameras, have become well known. Typically, the one-time-use camera is a simple point-and-shoot type comprising a plastic, inner, main body part which supports a fixed-focus taking lens, a film metering mechanism with a rotatably supported metering sprocket, a manual film advance thumbwheel, a single-blade shutter, a manual shutter release button, a frame counter for indicating the number of exposures remaining for picture-taking, a direct see-through viewfinder, a film cartridge, and in some models a fixed electronic flash. A pair of plastic front and rear cover parts house the main body part between them to complete the camera unit. The rear cover part connects to the main body part and/or to the front cover part to make the main body part light-tight. A decorative cardboard outer box contains the camera unit and has respective openings for the taking lens, the shutter release button, the film advance thumbwheel, the viewfinder, the frame counter, and a flash emission window for the electronic flash.

At the manufacturer, the film cartridge is placed in a cartridge chamber in the main body part and the front and rear cover parts are connected to the main body part and/or to the front cover part to complete the camera unit. Then, an exposed end of a take-up spool in a film supply chamber in the main body part is rotated to factory prewind substantially the entire length of an unexposed filmstrip from the film cartridge onto the take-up spool. Lastly, the outer box is placed on the camera unit.

During picture-taking, after the photographer takes a picture, he or she manually rotates the thumbwheel to rotate a film spool of the film cartridge, in order to wind an exposed frame of the filmstrip into the film cartridge and to unwind an unexposed frame from the take-up spool. The winding movement of the filmstrip the equivalent of slightly more than one frame width rotates the metering sprocket to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel.

When the maximum number of exposures available on the filmstrip are exposed and the filmstrip is completely wound into the film cartridge, the one-time-use camera is given to a photofinisher who opens one end of the outer box and removes the camera unit. Then, he separates the rear cover part of the camera unit from the main body part of the camera unit, removes the film cartridge with the filmstrip from cartridge chamber in the main body part, and removes the filmstrip from the film cartridge to develop the negatives and make prints for the customer. The used camera parts are forwarded to the manufacturer for recycling, i.e. remanufacture.

There is a need recognized in the industry to prevent unauthorized recycling of one-time-use cameras in order to maintain camera quality. Unauthorized recycled cameras may be of lesser quality than authorized recycled cameras.

SUMMARY OF THE INVENTION

According to one aspect of the invention, a one-time-use camera comprises:

a lighttight camera body having one exterior portion that can be separated from another exterior (remaining) portion;

a film cartridge and a filmstrip pre-loaded inside the camera body; and matching respective indicia on the outside of the camera body and on the film cartridge and/or the filmstrip, with the indicia on the outside of the camera body being positioned partially on the one exterior portion and partially on the other exterior portion to be divided in order to prevent complete reading of that indicia when the one exterior portion is separated from the other exterior portion. Thus, the one-time camera cannot practically be reused without removing or covering the part of the indicia on the other exterior (remaining) portion of the camera body.

According to another aspect of the invention, a method of preventing unauthorized recycling of a one-time-use camera, comprises the step of:

separating one exterior portion of a camera body from another exterior (remaining) portion of the camera body to divide readable indicia extending partially on the one exterior portion and partially on the other exterior portion in order to prevent complete reading of the indicia, whereby the one-time camera cannot practically be reused without removing or covering the part of the indicia on the other exterior portion of the camera body.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
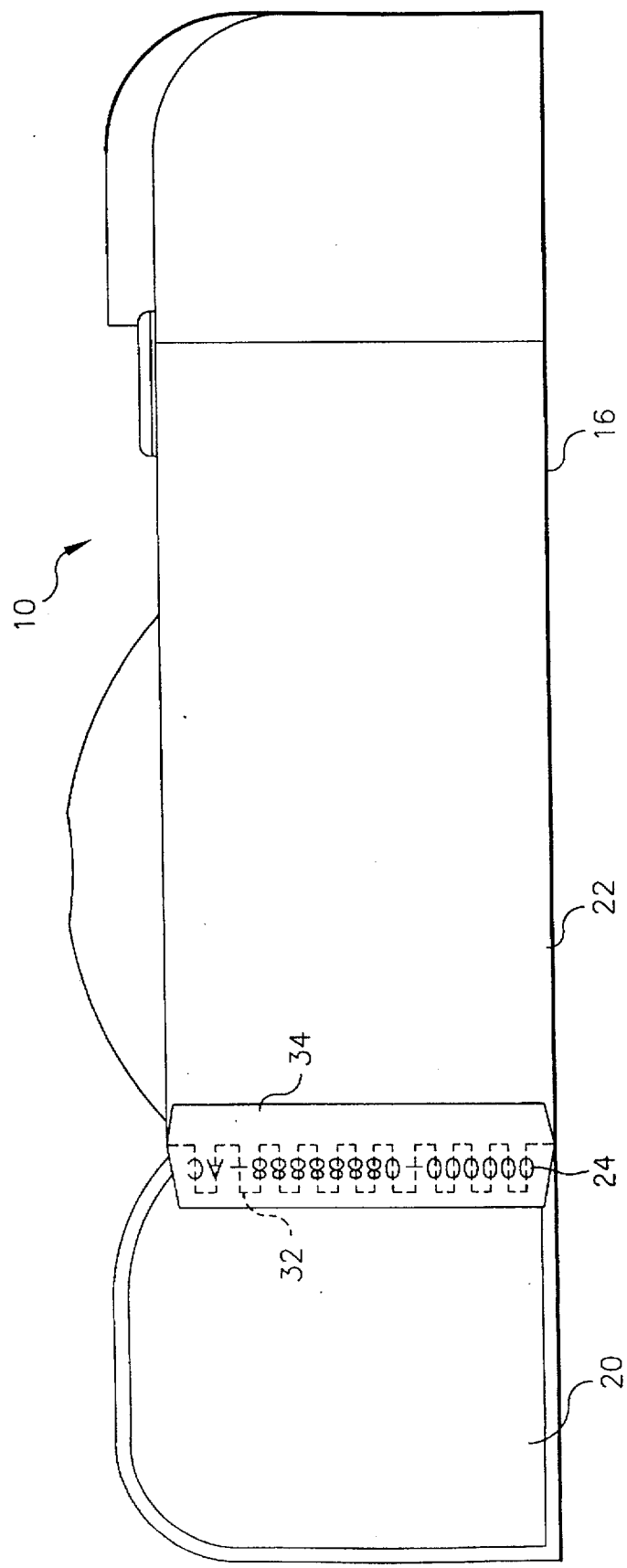
FIG. 1 is a bottom plan view of a one-time-use camera, which is a preferred embodiment of the invention.
Figure 2:
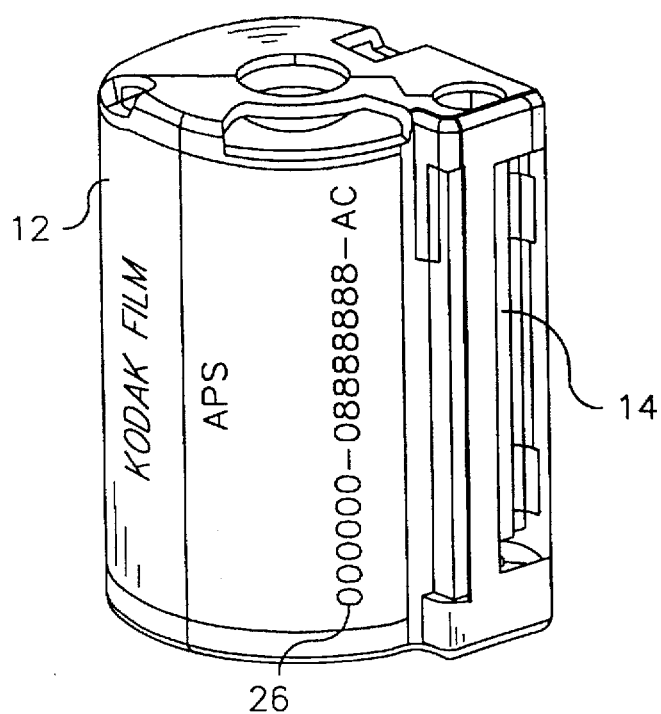
FIG. 2 is a perspective view of a film cartridge for a filmstrip to be pre-loaded in the camera body.
Figure 3:
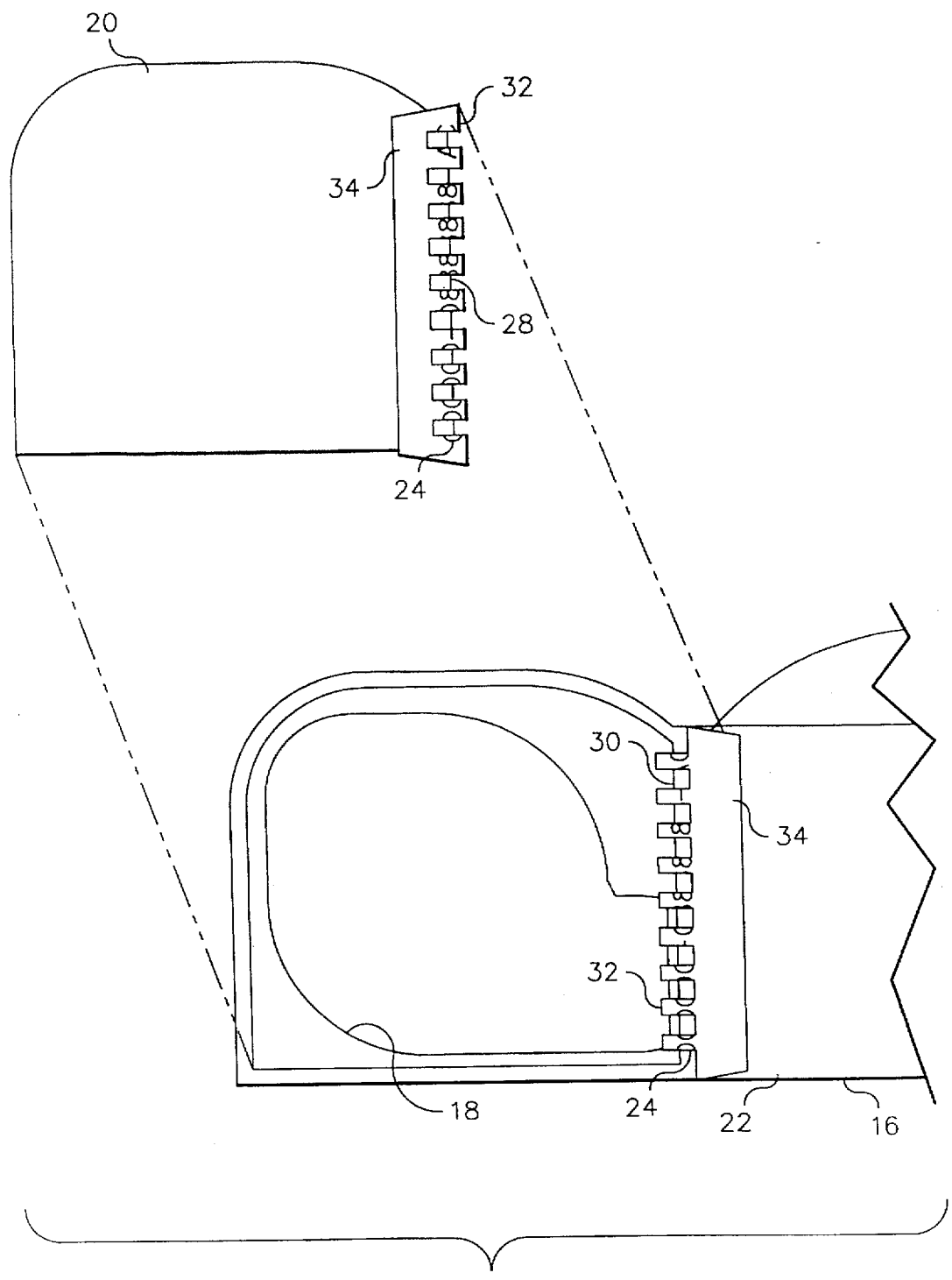
FIG. 3 is a bottom plan view of one end of the one-time-use camera, showing the camera body opened and the film cartridge removed.

Referring now to the drawings, FIGS. 1–3 show a one-time-use camera 10 which includes a film cartridge 12 for a filmstrip 14 and a lighttight plastic camera body 16. The camera body 16 has an interior chamber 18 for the film cartridge and an exterior cover portion 20 for light-tightly sealing the chamber. The exterior cover portion 20 of the camera body 16 can be manually separated from another exterior (remaining) portion 22 of the camera body to open the chamber 18 in order to remove the film cartridge 12 with the filmstrip 14 from the chamber.

As shown in FIGS. 1 and 2, matching respective identical indicia 24 and 26 are provided on the outside of the camera body 16 and on the film cartridge 12 (and/or on the filmstrip 14). The indicia 24 on the outside of the camera body 16 is positioned partially on the exterior cover portion 20 of the camera body 16 and partially on the other exterior portion 22 of the camera body, over respective separation edges 28 and 30 of the exterior cover portion and the other exterior portion. Thus, as shown in FIG. 3, when the exterior cover portion 20 is separated from the other exterior portion 22 to open the chamber 18, the indicia 24 is longitudinally divided to be visually obliterated in order to prevent complete reading of that indicia.

Preferably, the indicia 24 on the outside of the camera body 16 is printed substantially along a weakened (perforated) tear section 32 of a label 34 adhered partially to the exterior cover portion 20 of the camera body 16 and partially to the other exterior portion 22 of the camera body. Thus, as shown in FIG. 3, when the exterior cover portion 20 is separated from the other exterior portion 22 to open the chamber 18, the label 34 is torn completely along its tear section 32 into two halves, one with the exterior cover portion and one with the other exterior portion, similarly dividing the indicia 24.

Alternatively, of course, the indicia 24 can be etched partially on the exterior cover portion 20 of the camera body 16 and partially on the other exterior portion 22 of the camera body, across the respective separation edges 28 and 30 of the exterior cover portion and the other exterior portion, to be divided when the exterior cover portion is separated from the other exterior portion to open the chamber 18.

The invention has been described with reference to a preferred embodiment. However, it will be appreciated that variations and modifications can be effected by a person of ordinary skill in the art without departing from the scope of the invention. According to one example, the indicia 24 on the outside of the camera body 16 and the indicia 26 on the film cartridge 12 are shown in FIGS. 1 and 2 as identical sets of numbers and letters "000000-08888888-AC", however other indicia such as distinct markings, a bar code or a text message can be used. The set of numbers and letters "000000-08888888-AC" 24 on the outside of the camera body 16 is intended to be recorded by a photofinisher upon receipt of the one-time-use camera 10, to allow the photofinisher to begin to track the film cartridge 12 during the photofinishing process before the film cartridge is removed from the chamber 18 in the camera body 16. According to another example, the exterior cover portion 20 of the camera body 16 instead of serving to light-tightly seal the chamber 18 for the film cartridge 12 can serve to close a chamber in the camera body for a battery. Alternatively, the exterior cover portion 20 can be a known front or rear cover part of the camera body.

PARTS LIST 10. one-time-use camera
12. film cartridge
14. filmstrip
16. camera body
18. interior chamber
20. exterior cover portion
22. other exterior portion
24. indicia
26. indicia
28. separation edge
30. separation edge
32. weakened tear section
34. label

We claim:

1. A one-time-use camera comprising:

a lighttight camera body having one exterior portion that can be separated from another exterior portion;

a film cartridge and a filmstrip pre-loaded inside said camera body;

a label adhered partially to said one exterior portion of the camera bode and partially to said other exterior portion of the camera body and having a weakened tear section to be torn whenever the one exterior portion is separated from the other exterior portion; and matching respective indicia on said label and on said film cartridge and/or said filmstrip, with said indicia on said label being positioned along said weakened tear section to be divided in order to prevent complete reading of that indicia whenever the one exterior portion is separated from the other exterior portion.

2. A one-time-use camera as recited in claim 1, wherein said lighttight camera body has an interior chamber for said film cartridge, and said one exterior portion of the camera body that is separated from said other exterior portion of the camera body is a cover for closing said chamber and is removed from the chamber to open the chamber whenever the one exterior Portion is separated from the other exterior portion.

3. A one-time-use camera as recited in claim 1, wherein said label is provided across respective separation edges of said one exterior portion of the camera body and said other exterior portion of the camera body.

* * * * *